United States Patent [19]

Häussler

[11] 3,906,991

[45] Sept. 23, 1975

[54] HYDRAULIC LOWERING CHECK VALVE

[75] Inventor: Hubert Häussler, Neuheim, Switzerland

[73] Assignee: Beringer-Hydraulik GmbH., Neuheim, Switzerland

[22] Filed: Nov. 1, 1973

[21] Appl. No.: 411,917

[30] Foreign Application Priority Data
Nov. 9, 1972 Switzerland............... 16364/72

[52] U.S. Cl. ........ 137/630.13; 91/420; 137/630.15; 251/35; 251/38
[51] Int. Cl.² .......................................... F16K 1/00
[58] Field of Search............... 137/630.13, 630.15; 91/420; 251/35, 38, 121

[56] References Cited
UNITED STATES PATENTS

| | | | |
|---|---|---|---|
| 2,001,487 | 5/1935 | Doherty | 251/121 |
| 2,653,626 | 9/1953 | Finlayson | 91/420 X |
| 3,145,734 | 8/1964 | Lee et al. | 91/420 UX |
| 3,213,887 | 10/1965 | Angelery | 137/630.15 |
| 3,411,521 | 11/1968 | Johnson | 91/420 X |
| 3,447,568 | 6/1969 | Burkart et al. | 137/630.15 |

FOREIGN PATENTS OR APPLICATIONS 501,108  11/1954  Italy............... 137/630.15

Primary Examiner—Robert G. Nilson

[57] ABSTRACT

A hydraulic lowering brake check valve, which is under the pressure in a consuming device in a closed position and having a piston for opening the valve is disclosed, wherein the check valve comprises a brake check piston arranged between the consuming device connection and a discharge connection. The piston, in a position connecting the connections, acts as a throttle, is under the action of a compression spring provided in a chamber, comprises an axially extending groove connecting this chamber to the consuming device connection, and in a bore inside the piston and connected to the chamber there is a non-return valve, which has a surface subject to its closing pressure, which is substantially smaller than the surface of the opening piston subject to the opening pressure.

5 Claims, 1 Drawing Figure

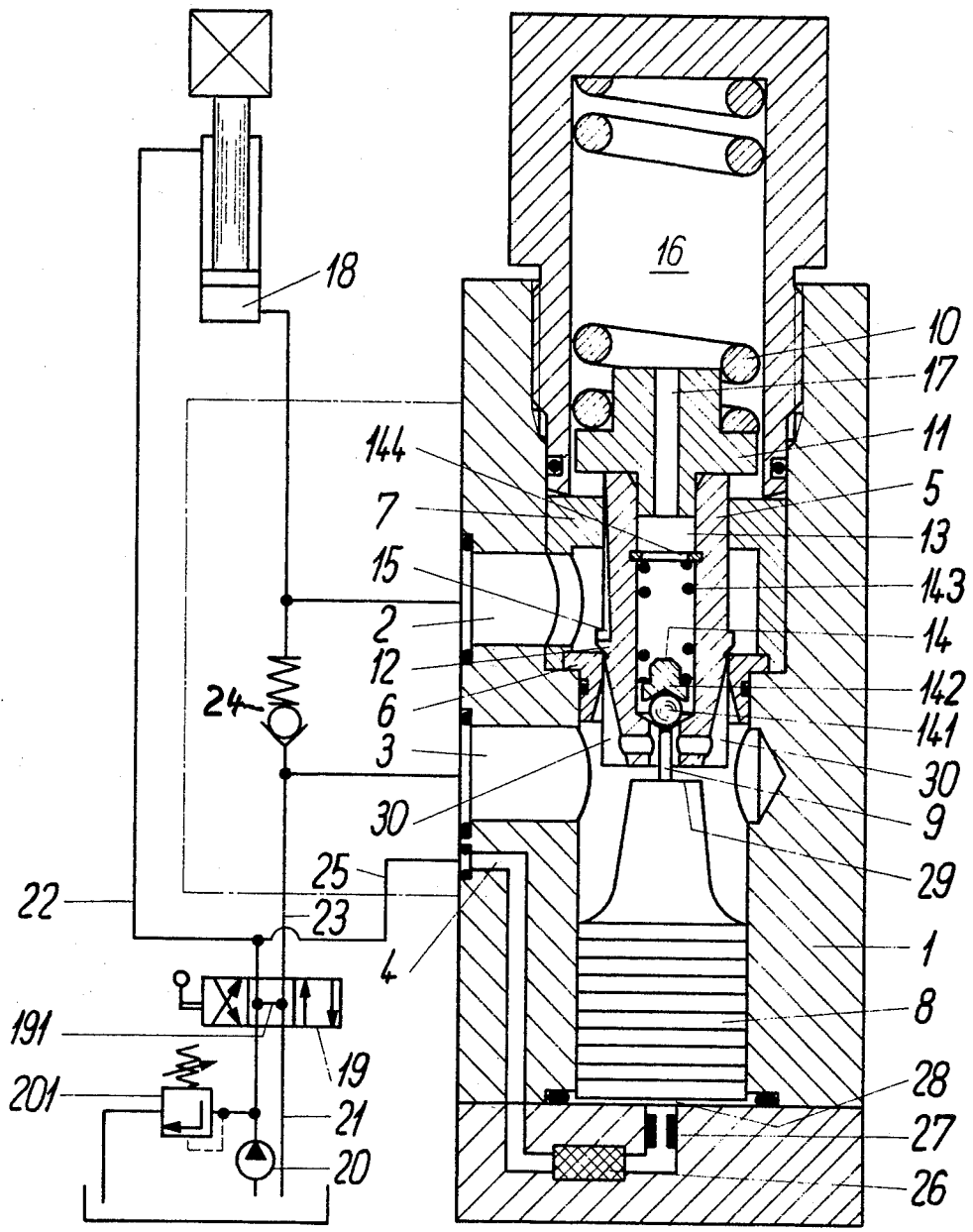

HYDRAULIC LOWERING CHECK VALVE

BACKGROUND OF THE INVENTION

The invention relates to a hydraulic lowering brake check valve for regulating the speed independently of the load of a connected consuming device, loaded by external forces and constructed as a double-acting piston cylinder unit.

It is the function of lowering brake check valves to regulate the discharge flow of a consuming device loaded by by external forces such that the latter does not move ahead of the intake flow, i.e. that a certain pressure is always required in the intake in order to keep the discharge open. If the brake piston is constructed as a seated piston, it simultaneously takes over the functions of a leak-proof sealing, controlled non-return valve.

Known embodiments of leak-proof lowering brake valves mainly constant of a combination of a brake valve and a controlled non-return valve in a housing, the brake piston opening the non-return piston by a plunger. Valves of this type have relatively large dimensions in comparison to the throughflow and are thus correspondingly expensive. It is a further drawback that they are additionally loaded in the closing direction by the load pressure occurring due to external forces in the consuming device, for which reason high opening pressures are necessary at the time of lowering the load, which implies an unnecessary loss of efficiency and thus heating of the oil.

The invention relates to a hydraulic lowering brake check valve, which integrates the function of a brake valve and a controlled non-return valve in one piston. Furthermore, by means of a preliminary discharge incorporated in the piston, it should be achieved that no axial forces act on the piston during the control by the load pressure, so that even with a great load pressure, only a low opening pressure is required and load pressure fluctuations do not have an effect on the control which promotes oscillations.

BRIEF SUMMARY OF THE INVENTION

The valve according to the present invention fulfills these requirements, with a leak-proof sealing check valve which is under the pressure in the consuming device in the closed position and an opening piston opening the latter for carrying out the said control. It is characterized in that the check valve comprises a brake check piston arranged between the consuming device connection and the discharge connection, which piston, in a position connecting the connections, acts as a throttle piston, is under the action of a compression spring provided in a chamber, and comprises an axially extending groove connecting this chamber to the consuming device connection. Moreover, there is provided in a bore in the inside of the piston and connected to the chamber, a preliminary discharge nonreturn valve, which has a surface subject to its closing pressure, which is substantially smaller than the surface of the opening piston subject to the opening pressure.

DETAILED DESCRIPTION OF A PREFERRED EMBODIMENT

The single FIGURE of the drawing shows a simplified cross section through one embodiment of the lowering brake check valve according to the invention, which is shown diagrammatically as being incorporated in a hydraulic installation.

The valve comprises a housing 1 with a consuming device connection 2, a discharge connection 3 and a control connection 4.

Located inside the housing 1 are a brake check valve piston 5, which is axially displaceable in a seating bushing 6 and a guide bushing 7, and also an opening piston 8 with a plunger 9. The brake check valve piston 5 is pushed into the inoperative position shown in the drawing, by a compression spring 10 by means of a spring washer 11. It thus bears against the seating bushing 6 by means of a conical shoulder 12 of somewhat greater diameter and checks the connection of the consuming device connection 2 to the discharge connection 3 in a leak-proof manner.

Located in an axially extending bore 13 inside the brake check valve piston 5 is a non-return valve 14 consisting of a ball 141, a spring washer 142 loading it, a compression spring 143 acting against the latter and a spring ring 144 against which bears the other end of the compression spring 143 and which is let into a groove in the bore 13.

At its periphery, the brake check valve piston 5 comprises an axially extending groove 15, which connects the consuming device connection 2 and a chamber 16 in which the spring 10 is located.

Provided in the spring washer 11 is an axial bore 17 connecting the spring chamber 16 to the bore 13, so that the pressure prevailing in the former may act on the spring washer 142 and thus on the ball 141 of the non-return valve 14.

The consuming device connected to the connection 2 is illustrated as a double-acting cylinder piston unit 18 which is under the action of external forces, such as for example a weight, which unit 18 is controlled by a four-way valve 19. The latter is connected, on the one hand, to a pump 20 with an excess-pressure valve 201 and to a return 21 and, on the other hand, by pipes 22 and 23 to the cylinder piston unit, the pipe 22 leading to the upper side and the pipe 23 to the lower side of the piston of the unit 18. Located in the pipe 23, between the connections 2 and 3 of the lowering brake check valve, is a non-return valve 24, which allows hydraulic fluid to flow in the direction of the unit 18, but prevents it in the opposite direction, so that the return flow must take the path through the lowering brake check valve.

Branching from the pipe 22 between the four-way valve 19 and unit 18, is a control pipe 25 to the control connection 4 which leads to the opening piston 8.

The lowering brake check valve illustrated in the drawing operates as follows:

In the position shown in the figure, owing to the coupling of the connection 2 to the chamber 16 formed by the axial groove 15, in addition to the force of the compression spring 10, the load pressure of the consuming device also acts on the spring washer 11 and thus on the upper end face of the brake check piston 5, so that it is pressed against its seat even more forcefully in the manner of a non-return valve under increasing pressure. For outward movement, i.e. for an upward movement (as shown) of the piston of the cylinder piston unit 18, the four-way valve 19 is displaced towards the right, due to which the pump 20 feeds into the pipe 23, whereas the pipe 22 is connected to the return 2. For by-passing the brake check valve, the non-return valve 24 may either be flange-mounted in a separate housing, or as shown in dot-dash lines, provided in a common housing with the brake check valve. Since the hydraulic fluid reaches the consuming device in the shortest way via the non-return valve 24, only a small pressure loss occurs in the valve.

For retracting, i.e. for moving the piston of the cylinder piston unit 18 downwards in the embodiment shown, the four-way valve 19 is displaced towards the left, so that the pump 20 feeds the pipe 22, whereas the pipe 23 is connected to the return 21. Since the piston 5 is still located in the closed position, the unit cannot carry out any movement, and pressure builds up in the pipe 22, which pressure acts by way of the control pipe 25, a filter member 26 and an exchangeable nozzle 27 on the lower side 28 of the opening piston 8. The latter moves upwards and thus opens the non-return valve 14 with the plunger 9 by raising the ball 141, due to which the load pressure in the spring chamber 16 is reduced to the pressure in the connection 3, since little hydraulic fluid flows into the spring chamber 16 through the axial groove 15. The brake check piston 5 is now thus balanced on both sides and is only pushed downwards by the force of the compression spring 10. Since the diameter of the piston 5 is the same in the vicinity of the seating bushing 6 and the guide bushing 7, the load pressure in the connection 2 cannot exert any axial force on the piston 5, so that the opening pressure depends solely on the spring 10. Since the force of the spring 143 is less than the force of the spring 10, the opening piston 8 finally bears with its upper end face 29 against the brake check piston 5 and with a further pressure rise in the pipe 25 lifts the latter from its seat. Conical axial grooves 30 are distributed uniformly about the periphery of piston 5 and now progressively open a cross-section between the connection 2 and 3, however, only until the pressure under the opening piston 8 is exactly sufficient to maintain this position against the force of the spring 10. Any change in the intake amount in the pipe 22 thus also changes the discharge cross-section between the connection 2 and 3, load changes being automatically taken into consideration.

Thus, the retraction speed of the piston of the unit 18 is solely dependent on the intake quantity and may be regulated as desired by the four-way valve 19. The acceleration and retardation of the retraction movement may be damped through the nozzle 27. The retardation is also still effective when the four-way valve 19 is suddenly switched to the zero position (i.e. the position shown in the drawing), since owing to the existing connection 191 between the pipes 21 and 22 to the return, hydraulic fluid may be both displaced into the return and sucked out of the latter. If the brake check valve is directly attached to the consuming device, then it also works as a self-closing valve, i.e. with a pipe fracture, the load is retarded in a damped manner.

It is a further advantage that even in the case of a fracture of the compression spring 10, the brake check valve closes or remains closed, because then the non-return valve 14 is closed by its spring 143 and thus the hydraulic fluid flowing through the axial groove 15 into the spring chamber 16 loads the piston 5 and pushes it towards the retracting opening piston 8. This is possible because then only the spring 143 is effective, since the compression spring 10 is inoperative. Then, the spring pushes the ring 144 and with it the piston 5 upwards until its lower end engages the ball 141 which is possibly seated on the plunger 9, due to which the non-return valve 14 closes and prevents a further escape of hydraulic fluid from the spring chamber 16 or bore 13. Since, on raising the piston 5, the consuming device connection 2 is connected to the return, the piston of the unit 18 descends, whereby the pressure in the pipe 22 also decreases despite the fact that the pump is operating. This pressure drop also takes effect in the pipe 25 and in the control connection 4, so that the opening piston 8 moves downwards. SInce, after closing the non-return valve 14, the pressure in the chamber 16 once more increases simultaneously to that in the connection 2, this pressure pushes the piston 5 behind the descending opening piston until it is seated on the seating bushing 6, whereby the lowering brake check valve is closed.

Owing to the illustrated preliminary discharge of the brake check valve piston 5 by way of the non-return valve 14, whose seating surface is approximately forty times less than the surface 28 of the opening piston 8, the load pressure has practically no effect on the opening pressure. This is thus pre-set solely by the pretensioning of the spring 10. For example in hydraulic motors this offers the possibility of hydraulically ventilating a brake normally present in the motor owing to the danger of leakages, at exactly the correct point of time, i.e. exactly at the beginning of movement of the hydraulic motor, in order to avoid a pressure rise (with ventilation which is too late) or a reversal of the motor (with ventilation which is too early).

If, in the case of a connected consuming device 18, the forces acting thereon change their direction during its movement, which is the case for example on moving a swinging arm which is movable in a vertical plane, through one of its dead centers, a lowering brake check valve must be incorporated in each of the pipes leading to the consuming device, in which case it would then be possible to arrange the latter together with the non-return valve 24 belonging to each valve, in a single housing.

While the preferred embodiment of the invention has been illustrated and described, the scope of the invention is to be determined solely by the appended claims.

I claim:

1. A hydraulic brake check valve comprising: a housing having an inlet for connection with a consumer and an outlet, first piston means having a substantially constant diameter throughout the length thereof and being arranged in said housing and movable to a closing position in which said first piston means blocks connection between said inlet and said outlet, spring means urging said first piston means into said closing position, a passage connecting said inlet with one side of said piston to urge said piston into said closing position when said inlet is under fluid pressure, said passage extending axially of said first piston means and having a cross-section steadily decreasing in the direction opposite to said closing direction, non-return valve means in said first piston means and connected to said passage, second piston means in said housing and being provided with means for engaging said non-return valve means, the effective area of said non-return valve means being substantially less than that of said second piston means, said first piston means being provided with axially extending grooves, spaced around the periphery thereof, the cross-section of said grooves increasing in a direction towards said second piston means, said second piston means having means for engaging said first piston means, whereby said second piston means is adapted to open said non-return valve means against the fluid pressure prevailing in said passage to thereby provide a connection between said inlet and said outlet, and whereby the cross-section of the connection between said inlet and said outlet gradually increases upon movement of said first piston means from its closing position upon engagement by said second piston means.

2. A valve according to claim 1, comprising spring washer means in said housing and arranged between said spring means and said first piston means, said spring washer means being provided with an axial bore connecting said non-return valve means with said passage.

3. A valve according to claim 1, wherein said first piston means has a bore and said non-return valve means is provided in said bore, a ring provided in said first piston means and projecting into said bore, and a compression spring arranged within said bore between said ring and said non-return valve means and urging said non-return valve means into its closing position.

4. A check valve according to claim 1, which comprises a plunger connected to said second piston means, said plunger being adapted to open said non-return valve means.

5. A check valve according to claim 4, wherein said non-return valve means has ball means rigidly connected to said plunger of said second piston means.

* * * * *